UNITED STATES PATENT OFFICE.

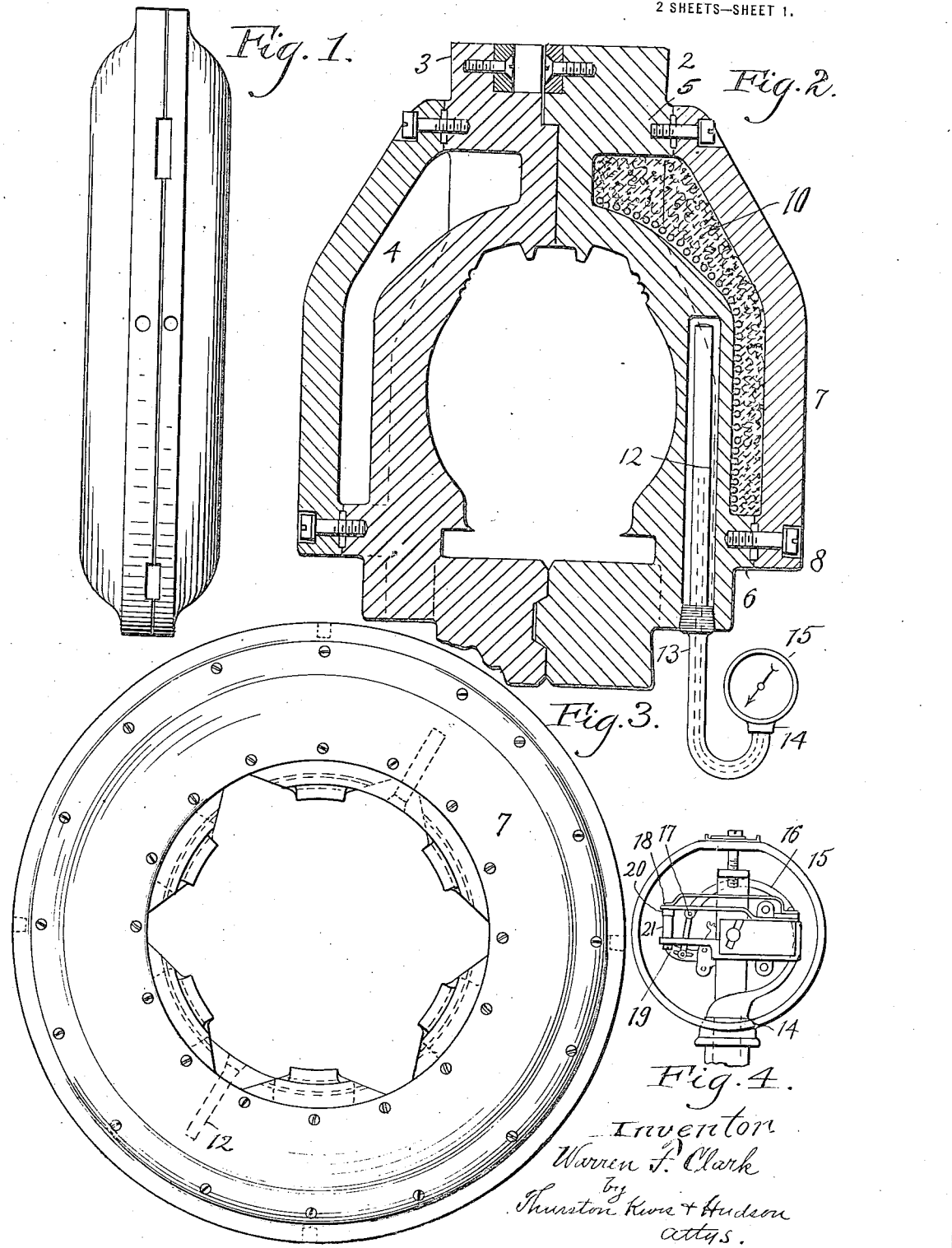

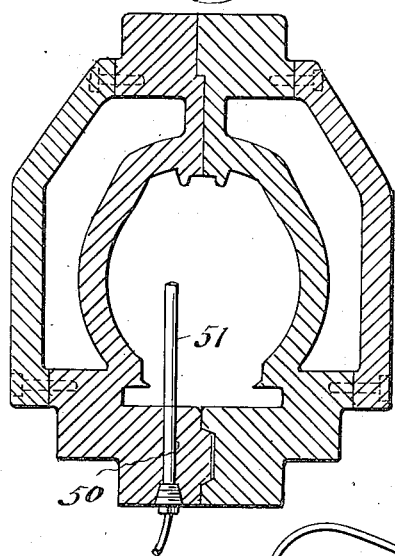
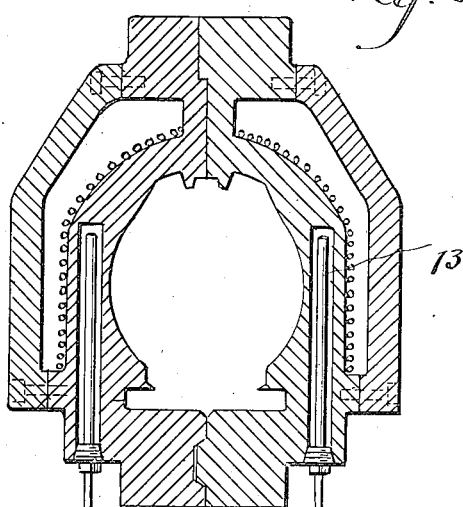
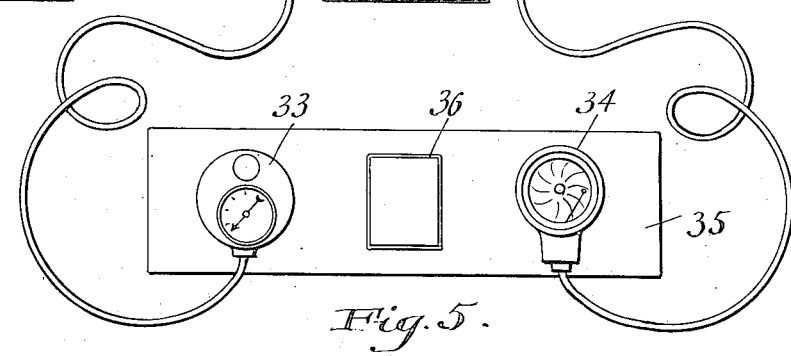
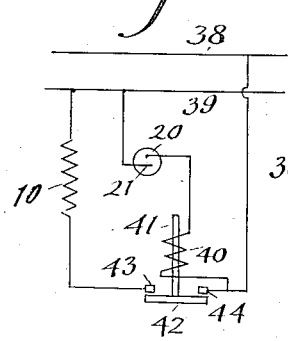
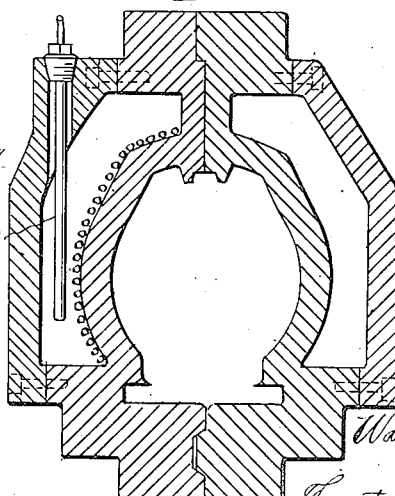

WARREN F. CLARK, OF CLEVELAND, OHIO, ASSIGNOR, BY MESNE ASSIGNMENTS, TO AUTOMATIC ELECTRIC HEATER COMPANY, OF WARREN, PENNSYLVANIA, A CORPORATION OF DELAWARE.

MOLD ADAPTED FOR USE IN VULCANIZING RUBBER ARTICLES.

1,422,084. Specification of Letters Patent. Patented July 11, 1922.

Application filed January 17, 1920. Serial No. 352,012.

*To all whom it may concern:*

Be it known that I, WARREN F. CLARK, a citizen of the United States, residing at Cleveland, in the county of Cuyahoga and State of Ohio, have invented a certain new and useful Improvement in Molds Adapted for Use in Vulcanizing Rubber Articles, of which the following is a full, clear, and exact description.
The present invention relates to a mold intended for use in the vulcanizing of rubber articles.

The present embodiment of the invention is shown and described with respect to a mold for vulcanizing rubber tires, although the invention is not limited in this respect.

The object of the invention is to provide a mold which may be heated by the heat from an electric resistance coil which is so associated with the mold that its heat will pass directly from the coil to the wall of the mold and thence to the article to be vulcanized.

A further object is to provide means for controlling the functioning of the electric resistance coil which is so positioned with respect to the coil and the article being vulcanized as to be very sensitive and responsive to changes in temperature condition.
A further object is to provide a mold so constructed that the resistance coil is associated with the mold in such a manner that it is readily accessible and at the same time is protected against injury and contact with water during the quenching or cooling operation after the vulcanizing action is completed and prior to the opening of the mold.

Other objects will appear more at large as the description proceeds.
Reference should be had to the accompanying drawings forming a part of this specification in which Fig. 1 is an elevation of a mold embodying my invention; Fig. 2 is a transverse sectional elevation of a portion of a mold; Fig. 3 is a side elevation of a mold; Fig. 4 is an elevation of a controlling element; Fig. 5 is a section of a tire mold showing a modified construction; Fig. 6 is a section of a tire mold showing an arrangement for remote placement of the circuit controlling devices and temperature recording devices; Fig. 7 is an electrical diagram; Fig. 8 shows a mold wherein the control member is inserted into the mold cavity.

Referring to the drawings and more particularly Fig. 2, a tire mold embodying my invention is provided in two parts indicated at 2 and 3, these two parts when associated forming the complete mold and parting in a plane which substantially bisects the mold. The interior cavity of the mold may be fashioned in any manner to produce the desired form of casing and tread portion therefor, and all of these forms no part of the present invention.

The two parts of the mold may be held together in any suitable manner, by clamps or otherwise as at present is common in the art.

Each part of the mold is formed with an annular cavity which extends around the mold section and is indicated at 4 in the drawings. The outer portion of each half of the mold is provided with a ledge 5 and adjacent the inner portion of each mold there is a ledge 6, each of these ledges being annular and are adapted ot receive a cover 7 which cover is secured to the mold section in any desired manner as by means of stud bolts 8. The upper surface of the ledges 5 and 6 and the cooperating surface of the cover 7 are provided with slight recesses adapted to receive packing material 9 so that when the cover 7 is bolted in position, the packing effects a sealed tight joint which prevents the entrance of water and the cover generally provides a protection for the electric resistance coil.

Within the cavity 4 there is an electric resistance coil 10 which is wound so as to lie against the inner wall of the cavity 4 and in substantially direct contact with the wall. This coil is covered by a layer of nonheat conducting material which is indicated at 11. This material is in its original condition plastic when applied to the coil so that the material 11 is molded in place serving to hold the coil in its proper position and at the same time forming a heat insulating body. The coil 10 and the heat resisting material occupy substantially all of the cavity 4 in each of the mold sections.

A suitable composition for embedding the electric coil as above explained is sold in the open market under the name "Alundum," and another composition which has been found suitable for the purpose is that which is disclosed in U. S. Patent No. 1,393,346, granted October 11, 1921.

As will be apparent, the heat generated by the passage of current through the resistance coil is applied directly to the inner walls of the mold and these walls in the present construction may be made much thinner than the walls of molds are usually made, and hence less heat is absorbed in the walls of the molds themselves than molds of usual construction wherein heat is applied to the outside of the mold and must penetrate from the outside through the mass of iron of which the molds are usually formed.

The electric resistance coil is in an exceedingly good position to directly apply the heat and hence practically the entire heating effect of the coils is applied to heating the rubber article which is to be vulcanized.

Furthermore, as is well known the tread portion of a tire is thicker than the sides hence by the present invention more heat may be applied to the tread and hence the cure may be controlled.

Each section of the mold is provided with a recess such as indicated at 12. This recess is adapted to receive such a device as illustrated in Fig. 4. This device comprises a tube 13 adapted to contain a readily volatilizable substance such as ether. One end of the tube is closed and the open end is secured to the neck 14 of a covering 15 within which is housed a Bourdon tube 16. The Bourdon tube at its free end is provided with a pin 17 which lies between contact carriers 18 and 19. These contact carriers are provided with contacts which are indicated at 20 and 21. One of the contact carriers, for instance, the contact carrier 18, is resilient and the pin 17 is positioned so that it may engage with the contact carrier 18, when the Bourdon tube is expanded and so break the contact.

Provision is made for adjusting the contact carriers 18 and 19 with respect to the pin 17 so that the relative position may be changed so as to cause engagement between contact carrier 18 and pin 17 at any predetermined pressure condition which pressure is a direct function of the temperature. The contacts 20 and 21 are normally in contact and are separated by the expansive action of the Bourdon tube. The contacts are in suitable connection with the circuit which includes one of the electric coils so that the functioning of the electric coil is controlled by the functioning of the Bourdon tube. The tube 13 of the control element is inserted in the recess 12 to which reference has before been made and as will be noted therefore, the tube 13 lies between the heating coil and the article being vulcanized, hence, the tube 13 is in direct path of the heat passing from the coil to the rubber article and rise in temperature is quickly imparted to the tube 13, which causes expansion of the Bourdon tube and so effects separation of the contacts 20 and 21 when the expansion of the Bourdon tube has reached the point for which adjustment has been made.

The action of the heat on the tube 13 is therefore a direct action and the volatile material in the tube 13 is effected by the heat coming from the heating coil before the heat passes to the article within the mold.

It will be apparent that a mold of the character described opens up a wide range of usefulness, inasmuch as the temperature to which the article being vulcanized is subjected, may be very accurately controlled by the controlling device and it is therefore only a question of controlling the time of application of heat to insure a thorough and proper vulcanization of the article contained in the mold.

In Fig. 5 there is shown a mold construction embodying the heating coil associated therewith, in which a tube 30 containing a readily volatilizable fluid is inserted through one of the covers 7, being mounted therein so that it extends into the space between the coil and the cover. This tube 30 is therefore more remote from the article being vulcanized than is the case in the construction shown in Fig. 2, but under certain circumstances it is desirable to control the functioning of the electric coil by a temperature condition which is more remote from the article to be vulcanized, so as to effect functioning of the electric coil under lower temperature conditions than would be the case where the tube containing the volatilizable substance is inserted within a wall of the mold itself as is the case in Fig. 2.

It will be understood that the tube 30 is connected to a suitable pressure responsive device which is associated with an electric circuit make and break device, such as shown in Fig. 4.

Fig. 8 embodies a mold construction wherein the inner part of the mold is provided with an opening, as indicated at 50, through which there may extend a tubular member 51 containing a readily volatilizable substance. The tube being connected with a pressure control device as previously explained. This construction permits the control of the heating coils to be governed by temperature conditions within the vulcanizing cavity of the mold.

In Fig. 6 there is shown an arrangement whereby the tubes such as tubes 13 are connected by means of what is known as capillary tubing, which is usually copper tubing of small internal diameter, such as indicated at 32, with a controlling device such as indicated at 33 and with a temperature indicating and controlling device such as indicated at 34. The devices which have just been referred to may be mounted upon a panel or board 35 which is situated at a point more or less remote from the position of the mold itself and the panel may be located at some central point where other panels connected with other molds are assembled, so that the condition and functioning of a plurality of molds may conveniently be kept track of by a single attendant.

By the foregoing it is not intended to mean that the panel 35 need necessarily be located at a point remote from the mold, as it may be located very near to the mold and the tubes 32 which are connected with the tubes 13, which are adapted to be inserted in the mold cavities, may be detached from the mold and removed after the vulcanizing operation is completed. The panel 35 may therefore carry all the necessary controlling and recording devices which are desirable or essential for securing the controlled functioning of the heating coil in the mold.

The panel 35 has indicated at 36, in a conventional manner, a relay with which the contacts 18 and 21 of the pressure control device (see Fig. 4) are connected.

The electrical connections are indicated in the diagram shown in Fig. 7, wherein 38 and 39 indicate the two wires of a power circuit from which electricity is secured for operating the heating coil or coils 10. A suitable relay device may consist of a coil 40 which is electrically connected with one of the contacts of the pressure control device, such for instance as the contact 20 and the other end of the coil may be connected with a conductor which connects with one of the conductors 38—39. Within the coil is an iron core 41 which at its lower end has a cross member 42. Located above the cross member 42 are contacts 43 and 44. Normally the contact member 42 is depressed and out of engagement with the contacts 43—44, however, when the coil 40 is energized, the core 41 is raised and the contacts 43 and 44 are connected. This establishes a circuit through the heating coil 10. The other contact to wit, the contact 21 of the pressure control device, is connected with one of the conductors 38 or 39, as illustrated in the diagram.

When the contacts 21 and 20 are in engagement, the coil 40 is energized and the contacts 43 and 44 are connected. When the contacts 20—21 are separated, the coil 40 is not energized and consequently the contacts 43—44 are not connected.

The relay is used because the current required by the coil 10 to effect the desired heating result is a heavy current and it cannot be handled by such contacts as the contacts 20 and 21 of the pressure controlling device. The diagrammatic representation and description of the relay as given is merely to indicate the manner in which a relay would be used in the present connection and is not at all limiting, because other forms of relay may be used.

In instances employing the invention where the quantity of current which is handled by the heating coil is not a heavy one and one such as could be taken care of without injury of the contacts 20 and 21 of the pressure controlling device, the electric circuit including the heating coil may be directly controlled by the make and break between the contacts 20 and 21.

Having described my invention, I claim—

1. The combination with a mold for use in vulcanizing rubber articles, said mold having a wall of approximately uniform thickness, one surface of which is adapted to cooperate with the article to be molded, an electric heating coil cooperating with the other surface of the wall and substantially coextensive with the first mentioned surface of the wall.

2. The combination with a mold for use in vulcanizing rubber articles, said mold having a wall, a surface of which is adapted to cooperate with the article to be vulcanized, said mold being provided with a recessed portion, of an electric heating coil occupying said recessed portion and engaging with an outer surface of said wall and substantially coextensive with the inner or molding surface.

3. The combination with a mold for use in vulcanizing rubber articles, said mold having a wall, the inner surface of which is adapted to cooperate with an article to be molded, said mold having a recessed portion, an electric heating coil in said recess and cooperating with the outer surface of said wall and substantially coextensive with the inner or molding surface and a cover member secured to the mold and enclosing the coil in the recessed portion.

4. In combination, a mold adapted for use in vulcanizing rubber articles, said mold having a wall, the inner surface of which is adapted to cooperate with the article to be vulcanized, an electric heating coil cooperating with the outer surface of said wall and substantially coextensive with the inner surface thereof, a recess in the said wall between the inner and outer surface thereof adapted to receive a temperature responsive device.

5. In combination, a mold adapted for use in vulcanizing rubber articles composed of a plurality of cooperating sections, each of said mold sections having a wall of approximately uniform thickness, the inner surfaces of which walls form the mold cavity for the article to be vulcanized, an electric heating coil cooperating with the outer surface of each such wall and substantially coextensive with the inner surface of each wall.

6. In combination, a mold adapted for use in vulcanizing rubber articles, said mold comprising a plurality of cooperating sections, each of said sections being formed with a wall, the inner surface of which forms a part of the mold cavity, a heating coil cooperating with the outer surface of each wall, said heating coil substantially covering said surface, each of said walls having a recess lying between the outer and inner surface of the wall adapted to receive a temperature responsive device.

7. In combination, a tire mold composed of two cooperating sections, each of said sections having a wall, the inner surface of which forms part of the mold cavity, an electric heating coil cooperating with the outer surface of said wall and substantially covering the same, a cover member secured to said mold and enclosing the heating coil.

8. In combination, a mold adapted for use in vulcanizing rubber articles, said mold having a wall, the inner surface of which forms part of the mold cavity, a heating coil cooperating with the outer surface of said wall substantially covering the same, a recess in said wall lying between the inner and outer surface thereof, a temperature responsive device inserted in said recess and a connection between the coil and the temperature responsive device whereby the functioning of the coil is controlled by said temperature responsive device.

9. In combination, a mold adapted for use in vulcanizing rubber articles, said mold comprising a plurality of sections, each of said sections being formed with a wall the inner surface of which forms a part of the mold cavity, a heating coil cooperating with the outer surface of each wall, said heating coil substantially covering said surface, a cover overlying each heating coil and secured to a mold section.

10. In combination, a mold adapted for use in vulcanizing rubber articles, said mold comprising a plurality of sections, each of said sections being formed with a wall the inner surface of which forms a part of the mold cavity, a heating coil cooperating with the outer surface of each wall, said heating coil substantially covering said surface, a cover overlying each heating coil and secured to a mold section, an opening formed in said cover, a tube containing a volatilizable substance extending through said opening and secured therein.

11. In combination, a mold adapted for use in vulcanizing rubber articles, said mold comprising a plurality of sections, each of said sections being formed with a wall the inner surface of which forms a part of the mold cavity, a heating coil cooperating with the outer surface of each wall, said heating coil substantially covering said surface, a cover overlying each heating coil and secured to a mold section, said cover having an opening, a tube adapted to contain a volatilizable substance extending through said opening and into the space between the electric coil and the cover.

12. In combination, a mold adapted for use in vulcanizing rubber articles, said mold comprising a plurality of sections, each of said sections being formed with a wall the inner surface of which forms a part of the mold cavity, a heating coil cooperating with the outer surface of each wall, said heating coil substantially covering said surface, a cover overlying each heating coil and secured to a mold section, said cover having an opening, a tube adapted to contain a volatilizable substance extending through said opening and into the space between the electric coil and the cover, a temperature responsive device associated with said tube, connections between the said coil and the temperature responsive device whereby the functioning of the coil is controlled by said temperature responsive device.

13. In combination, a mold adapted for use in vulcanizing rubber articles, an electric heating coil associated with said mold, a tube adapted to contain a volatilizable substance associated with said mold, a panel, a pressure responsive device carried by the panel, a conduit connecting the pressure responsive device with the said tube, electric connections between the pressure responsive device and the heating coil for the mold.

In testimony whereof, I hereunto affix my signature.

WARREN F. CLARK.